(12) United States Patent
Yilmaz et al.

(10) Patent No.: US 11,330,656 B2
(45) Date of Patent: May 10, 2022

(54) UE CAPABILITY SIGNALING FOR TIGHT-INTERWORKING

(71) Applicant: Telefonaktiebolaget LM Ericsson (publ), Stockholm (SE)

(72) Inventors: Osman Nuri Can Yilmaz, Espoo (FI); Stefan Wager, Espoo (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/347,378

(22) PCT Filed: Nov. 3, 2017

(86) PCT No.: PCT/EP2017/078174
§ 371 (c)(1),
(2) Date: May 3, 2019

(87) PCT Pub. No.: WO2018/083230
PCT Pub. Date: May 11, 2018

(65) Prior Publication Data
US 2020/0267791 A1  Aug. 20, 2020

Related U.S. Application Data

(60) Provisional application No. 62/417,802, filed on Nov. 4, 2016.

(51) Int. Cl.
*H04W 76/16* (2018.01)
*H04W 8/24* (2009.01)
(Continued)

(52) U.S. Cl.
CPC ............. *H04W 76/16* (2018.02); *H04W 8/24* (2013.01); *H04W 88/06* (2013.01); *H04W 92/20* (2013.01)

(58) Field of Classification Search
CPC ......... H04W 28/0215; H04W 52/0216; H04W 76/25; H04W 76/27; H04W 76/28;
(Continued)

(56) References Cited

U.S. PATENT DOCUMENTS 11,005,639 B2 * 5/2021 Kazmi ................. H04L 5/0078
11,019,523 B2 * 5/2021 Vikberg ............ H04W 28/0252
(Continued)

FOREIGN PATENT DOCUMENTS

CN         103329458 A    9/2013
CN         104641690 A    5/2015

OTHER PUBLICATIONS

3GPP TS 36.300 V14.0.0 (Sep. 2016); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14) (Sep. 2016). (314 pages).
(Continued)

*Primary Examiner* — Mewale A Ambaye
(74) *Attorney, Agent, or Firm* — Rothwell, Figg, Ernst & Manbeck, P.C.

(57) ABSTRACT

This disclosure provides mechanisms for User Equipment, UE, capability signaling and coordination for Long Term Evolution (LTE) and New Radio (NR) tight-interworking without increasing the complexity of LTE capability reporting. This disclosure proposes a capability signaling and coordination framework in order to coordinate at least band combinations and Layer 2 buffer capabilities across the master and the secondary nodes which are of different Radio Access Technologies (RATs), such as LTE and NR.

13 Claims, 10 Drawing Sheets

(51) Int. Cl.
*H04W 88/06* (2009.01)
*H04W 92/20* (2009.01)

(58) Field of Classification Search
CPC ............... H04W 8/24; H04W 72/0413; H04W 72/0426; H04W 88/06; H04W 92/20
See application file for complete search history.

(56) References Cited

U.S. PATENT DOCUMENTS

| | | | | |
|---|---|---|---|---|
| 2012/0088540 | A1* | 4/2012 | Smith | H04L 67/303 455/550.1 |
| 2015/0230107 | A1 | 8/2015 | Chiba et al. | |
| 2017/0374607 | A1* | 12/2017 | Wu | H04W 88/10 |
| 2018/0343679 | A1* | 11/2018 | Sahlin | H04W 48/10 |
| 2018/0368140 | A1* | 12/2018 | Centonza | H04W 72/0426 |
| 2019/0110190 | A1* | 4/2019 | Van Lieshout | G06F 21/44 |
| 2019/0357199 | A1* | 11/2019 | Ali | H04W 72/048 |
| 2020/0267753 | A1* | 8/2020 | Adjakple | H04W 72/1226 |
| 2020/0305041 | A1* | 9/2020 | Fan | H04W 72/046 |
| 2020/0413247 | A1* | 12/2020 | Van Lieshout | H04W 8/24 |

OTHER PUBLICATIONS

International Search Report and Written Opinion dated Jan. 11, 2018 issued in International Application No. PCT/EP2017/078174. (13 pages).
Samsung, "UE capability coordination in case of IRAT DC, further solution details", 3GPP TSG-RAN WG2 Meeting #95 bis, R2-166660, Kaohsiung, Taiwan, (Oct. 2016), XP051162204. (6 pages).
Intel Corporation (Rapporteur), "Report of email discussion: [p4#39][NR] C plane aspects for tight interworking", 3GPP TSG-RAN WG2 Meeting #95, R2-165012, Gothenburg, Sweden, (Aug. 2016), XP051126652. (38 pages).
Samsung, "UE capability coordination in case of IRAT DC", 3GPP TSG-RAN WG2 Meeting #95, R2-165044, Gothenburg, Sweden, (Aug. 2016), XP051126676. (6 pages).
Ericsson, "RRC configuration in LTE-NR tight-interworking", 3GPP TSG-RAN WG2 #95bis, Tdoc R2-166775, Kaohsiung, Taiwan, (Oct. 2016), XP051162237. (3 pages).
Ericsson, "UE capability signalling for tight interworking", 3GPP TSG-RAN W2 #96, Tdoc R2-168296, Reno, Nevada, (Nov. 2016), XP051193002. (3 pages).
3GPP TR 23.799 V1.1.0 (Oct. 2016), 3rd Generation Partnership Project; Technical Specification Group Services and System Aspects; Study on Architecture for Next Generation System (Release 14), (Oct. 2016). (501 pages).
3GPP TR 38.913 V14.0.0 (Oct. 2016), 3rd Generation Partnership Project; Technical Specification Group Radio Access Network; Study on Scenarios and Requirements for Next Generation Access Technologies; (Release 14), (Oct. 2016). (39 pages).
NTT Docomo, "New SID Proposal: Study on New Radio Access Technology", 3GPP TSG RAN Meeting #71, RP-160671, Goteborg, Sweden, (Mar. 2016). (8 pages).
3GPP TS 36.300 V.13.4.0. (Jun. 2016), 3rd Generation Partnership Project; Technical Specification Group Radio Access Network; Evolved Universal Terrestrial Radio Access (E-UTRA) and Evolved Universal Terrestrial Radio Access Netowkr (E-UTRAN); Overall description; Stage 2 (Release 13), Jun. 2016 (310 pages).
Ericsson, "UE capability principle and signalling", 3GPP TSG-RAN WG2 #95bis, Tdoc R2-166782, Kaohsiung, Taiwan, Oct. 10-14, 2016 (4 pages).

\* cited by examiner

UE CAPABILITY SIGNALING FOR TIGHT-INTERWORKING

CROSS REFERENCE TO RELATED APPLICATION(S)

This application is a 35 U.S.C. § 371 National Stage of International Patent Application No. PCT/EP2017/078174 filed Nov. 3, 2017, designating the United States and claiming priority to U.S. provisional application No. 62/417,802, filed on Nov. 4, 2016. The above identified applications are incorporated by reference.

TECHNICAL FIELD

Disclosed herein are embodiments for User Equipment capability signaling and coordination for Long Term Evolution and New Radio tight-interworking.

BACKGROUND

The Third Generation Partnership Project (3GPP) has started work on the development and design of the next generation mobile communications system (a.k.a., the 5G mobile communication system or simply "5G" for short). 5G will encompass an evolution of today's 4G networks and the addition of a new, globally standardized radio access technology known as "New Radio" (NR).

Overall requirements for the Next Generation (NG) architecture (see TR 23.799, Study on Architecture for Next Generation, which is incorporated herein by reference in its entirety) and, more specifically the NG Access Technology (see TR 38.913, Study on Scenarios and Requirements for Next Generation Access Technologies, which is incorporated herein by reference in its entirety) may impact the design of 5G (see RP-160671, New SID Proposal: Study on New Radio Access Technology, DoCoMo, which is incorporated herein by reference in its entirety) from mobility to control plane design and mechanisms.

SUMMARY

In RAN2#95, the following agreements were made regarding the UE capability signaling: From a RAN2 perspective, we aim to have an independent capability information for NR and LTE (meaning that node of one RAT does not need to look at the capabilities of the other RAT). Does not preclude that capabilities of one RAT might contain some information related to the other RAT (e.g. at least measurement capabilities).

Then, in RAN2#95bis the following was agreed upon regarding UE capability signaling:
 a. We should aim to minimum the differences between the NR capability reporting across the LTE/NR tight interworking cases (NR gNB as a master node) and the standalone NR gNB case.
 b. At least some band combinations across RATs should be coordinated across the master and the secondary nodes.
 c. Layer 2 buffer capabilities should be coordinated across the RATs should be coordinated across the master and the secondary nodes.
 d. The master node and the secondary node only need to use own RAT UE capabilities (which will include some other RAT capabilities relating to the interworking). At least for the initial configuration of interworking case these are provided on the master node RAT or from core network Capability signaling for LTE became increasingly complex. Accordingly new solutions are required to avoid further increasing the complexity of the UE capability signaling. Adding the NR capabilities on top of the LTE capability structure may further complicate the LTE capability signaling, and extent the structure further by indicating also NR support for the different band combinations.

Embodiments of the present invention propose a solution for signaling of UE LTE+NR capabilities (i.e., joint capability information relevant to both a LTE RAT and a NR RAT) to the network for LTE-NR tight interworking in 5G that causes minimum change to the LTE specifications. This may be achieved by including the LTE+NR capability information in a transparent container of the LTE capability signaling messaging. The encoding of the LTE+NR capability information is defined in the NR RRC specification. This signalizing procedure enables network implementations where LTE eNB is not required to understand the LTE+NR capability information, by letting the NR node select first the NR configuration and then indicating the remaining UE capabilities to the LTE eNB.

According to one aspect, a method performed by a user equipment (UE) to signal capabilities for a first radio access technology (RAT) and a second RAT different from the first RAT is provided. The method comprises: transmitting a first message (301) to a first network node (110, 120), the first network node (110, 120) implementing the first RAT, wherein the first message comprises joint capability information relevant to both the first RAT and the second RAT.

In some embodiments, the first RAT is a Long Term Evolution, LTE, RAT and the second RAT is a New Radio, NR, RAT. In such embodiments, the first message is a LTE Radio Resource Control, RRC, message.

In some embodiments, the first RAT is a New Radio, NR, RAT and the second RAT is a Long Term Evolution, LTE, RAT. In such embodiments, the first message is a NR Radio Resource Control, RRC, message.

In some embodiments, the first message comprises a NR RRC Protocol Data Unit, PDU, comprising the joint capability information.

In other embodiments, the first message comprises a NR RRC Information Element, IE, comprising the joint capability information.

In some embodiments, the first message further comprises a second UE capability information for the second RAT.

In some embodiments, the joint capability information comprises band combination information.

In some embodiments, the method further comprises receiving a second message (307) from the first network node (110, 120), the second message comprising configuration data, wherein the configuration data comprises a first configuration for the first RAT and a second configuration for the second RAT.

In some embodiments, the joint capability information is specified in a NR specification.

In another aspect, a UE is provided. The UE may comprise a memory, a transmitter, a receiver and a data processing system comprising one or more processors, wherein the UE is configured to perform any one of embodiments disclosed above.

In yet another aspect, a method is performed by a first network node (110, 120) of a first Radio Access Technology, RAT. The method comprises receiving a first message (301, 303) comprising joint capability information relevant to both the first RAT and a second RAT different than the first RAT.

In some embodiments, the first message comprises a New Radio, NR, Radio Resource Control, RRC, Protocol Data Unit, PDU, comprising the joint capability information.

In some embodiments, the first message comprises a NR RRC Information Element, IE, comprising the joint capability information.

In some embodiments, the first message further comprises a first UE capability information for the first RAT.

In some embodiments, the first message further comprises a second UE capability information for the second RAT.

In some embodiments, the joint capability information comprises band combination information.

In some embodiments, the joint capability information is specified in a NR specification.

In some embodiments, the first RAT is a Long Term Evolution, LTE, RAT and the second RAT is a New Radio, NR, RAT.

In some embodiments, the first message (301) is received from a User Equipment, UE (105), and the method further comprises after receiving the first message (301), transmitting (504) to a second network node (110) of the second RAT a second message (303) comprising the joint capability information.

In some embodiments, the method further comprises after transmitting the second message (303), receiving a third message (305) transmitted by the second network node (110).

In some embodiments, the third message comprises configuration information for the UE (105) selected by the second network node (110) based on the joint capability information.

In some embodiments, the configuration information for the UE (105) is a NR SCG configuration.

In some embodiments, the third message further comprises UE (105) capability information enabling the first network node (120) to select a second configuration for the UE (105).

In some embodiments, the method further comprises the first network node (120) selecting a second configuration for the UE (105) based on the joint capability information.

In some embodiments, the second configuration for the UE (105) is a LTE MCG configuration.

In some embodiments, the method further comprises the first network node reads and decodes the joint capability information included in the first message (301), the first network node uses the joint capability information to select an LTE MCG configuration; and the first network node transmits to a NR network node message information pertaining to the selected LTE MCG configuration.

In some embodiments, the third message comprises an NR Radio Resource Control, RRC, Protocol Data Unit, PDU, and the method further comprises the first network node (120) forwarding the NR RRC PDU to the UE (105).

In some embodiments, the third message comprises an NR Radio Resource Control, RRC, Information Element, IE, and the method further comprises the first network node (120) forwarding the NR RRC IE to the UE (105).

In some embodiments, the first RAT is a New Radio, NR, RAT and the second RAT is a Long Term Evolution, LTE, RAT.

In some embodiments, the first message is received from a second network node (120), and the method further comprises after receiving the first message, transmitting (602) to the second network node (120) a second message.

In some embodiments, the method further comprises the first network node (110) selecting a first configuration information for the UE (105) based on the joint capability information; and the second message comprises the selected first configuration information.

In some embodiments, the selected first configuration information is a NR SCG configuration.

In some embodiments, the second message comprises UE (105) capability information enabling the second network node (120) to select a second configuration for the UE (105).

In some embodiments, the second configuration for the UE (105) is an LTE MCG configuration.

In some embodiments, the second message comprises a New Radio, NR, Radio Resource Control, RRC, Protocol Data Unit, PDU, and the second network node (120) is configured to forward the NR RRC PDU to the UE (105).

In some embodiments, the second message comprises a NR, Radio Resource Control, RRC, Information Element, IE, and the second network node (120) is configured to forward the NR RRC IE to the UE (105).

In some embodiments, the method further comprises the first network node reads and decodes the joint capability information included in the first message, the first network node uses the joint capability information to select a NR SCG configuration, and the first network node transmits to a LTE network node (120) message information pertaining to the selected NR SCG configuration.

In yet another aspect, a network node (110, 120) is provided. The network node (110, 120) may comprise a memory (842), a transmitter (805), a receiver (806), and a data processing system (802) comprising one or more processors (855), wherein the network node (110, 120) is configured to perform any one of the embodiments disclosed above.

BRIEF DESCRIPTION OF THE DRAWINGS

The accompanying drawings, which are incorporated herein and form part of the specification, illustrate various embodiments.

DETAILED DESCRIPTION

Figure 1:
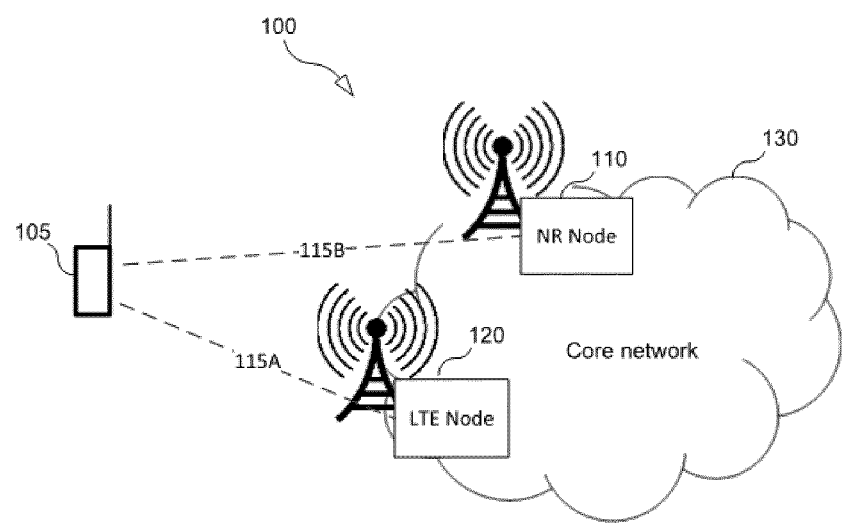
FIG. 1 illustrates an exemplary wireless communications system according to some embodiments.

FIG. 1 illustrates an exemplary wireless communications system according to some embodiments. Wireless communications system 100 may comprise a User Equipment 105 (i.e., fixed or mobile wireless communication device) and one or more base stations utilizing LTE and NR technology, such as LTE node 120 (e.g., an eNB in LTE) and a NR Node 110 (e.g., a NR RRC entity for the next generation/5G access technologies, referred to herein as gNB). In some embodiments, the LTE Node 120 and NR Node 110 are further in communication with a core network 130.

In some embodiments, the LTE node 120 and/or the NR Node 110 may serve the UE 105 as indicated by links 115A-B. In some embodiments, one of the LTE node 120 and/or the NR Node 110 may be acting as a master network node, and the other one of the LTE node 120 and/or the NR Node 110 may be acting as a secondary network node that further provides additional resources for the UE 105, such as serving cells. For example, a secondary network node may provide additional resources based on a received measurement report, traffic conditions, or bearer types.

LTE Dual Connectivity—Secondary eNB Addition

In LTE Dual Connectivity (DC), thanks to the mutual intelligibility between master and secondary network nodes, a master eNB (MeNB) 120 is able to maintain the RRM measurement configuration of the UE 105 for mobility procedures. Furthermore, the MeNB 120 may decide to ask a secondary eNB (SeNB) to provide additional resources (serving cells) for a UE 105 e.g., based on the received measurement reports or traffic conditions or bearer types as it is straightforward the interpret those by the RRC entity located at the master network node 120. Therefore, the mobility can mainly be coordinated by the MeNB 120 in case of LTE DC.

Figure 2:
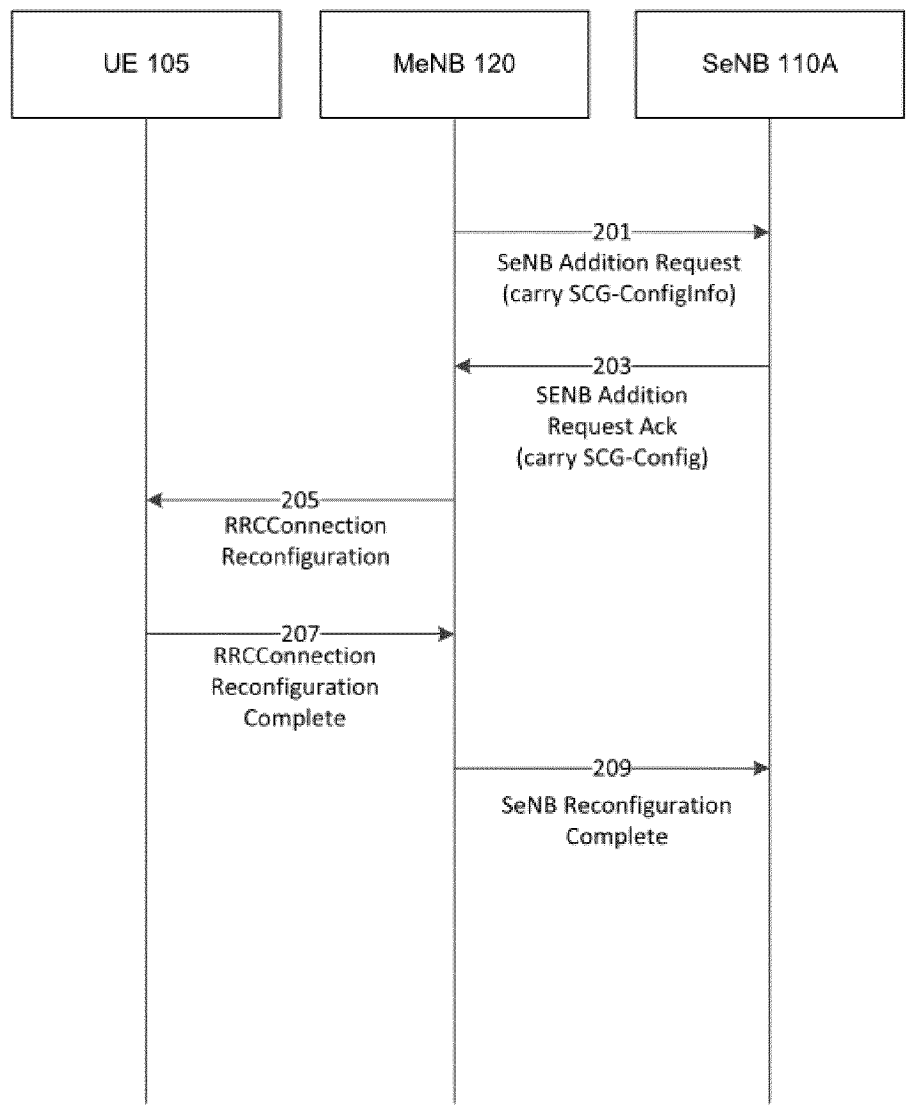
FIG. 2 illustrates a prior art signaling diagram.

FIG. 2 is a prior art signaling diagram for LTE DC based on 3GPP TS 36.300, which is incorporated by reference herein in its entirety. UE capability coordination in LTE DC is based on the MeNB providing the SeNB with the complete set of UE capabilities and the MCG configuration in SCG-ConfigInfo in the SeNB Addition Request message 201, which initiates the procedure. From the MCG configuration and UE capabilities, the SeNB can derive an SCG configuration that combined with the MCG configuration complies with the UE capabilities. The SeNB then forwards the SCG configuration in SCG-Config in the SeNB Addition Request Acknowledge message 203 back to the MeNB. Based on this the MeNB can verify valid UE configuration and possibly update the MCG configuration. Finally, the MeNB includes both MCG and SCG configurations in the RRCConnectionReconfiguration message 205, which is then forwarded to the UE. In return, the UE 105 may transmit a RRCConnectionReconfigurationComplete message 207 back to the MeNB 120. The MeNB 120 may then transmit a Reconfiguration Complete message 209 to the SeNB 110.

UE Capability Signaling for Tight LTE-NR Interworking

The disclosure proposes a set of embodiments for UE capability signaling and coordination for LTE and NR tight-interworking without increasing the complexity of LTE capability reporting. Accordingly, the UE 105 reports NR+LTE capabilities via a NR RRC message carried in a transparent container of LTE RRC, and the NR node 110 makes the decision for what UE capabilities can be used for NR radio access. Then, it informs the LTE node 120 about what capabilities are left to be used by the LTE radio access. Finally, LTE node 120 can select what to use in the remainder of capabilities and inform the UE 105.

Advantages of this disclosure include that LTE capability reporting does not need to become more complex to handle LTE-NR tight-interworking, and the impact on LTE specifications may be minimized by including the LTE+NR capability information including all possible combinations mainly in the NR specification. Thus, the disclosure proposes a capability signaling and coordination framework in order to coordinate at least band combinations and L2 buffer capabilities across the master and the secondary nodes which are of different RATs, such as LTE and NR.

Figure 3:
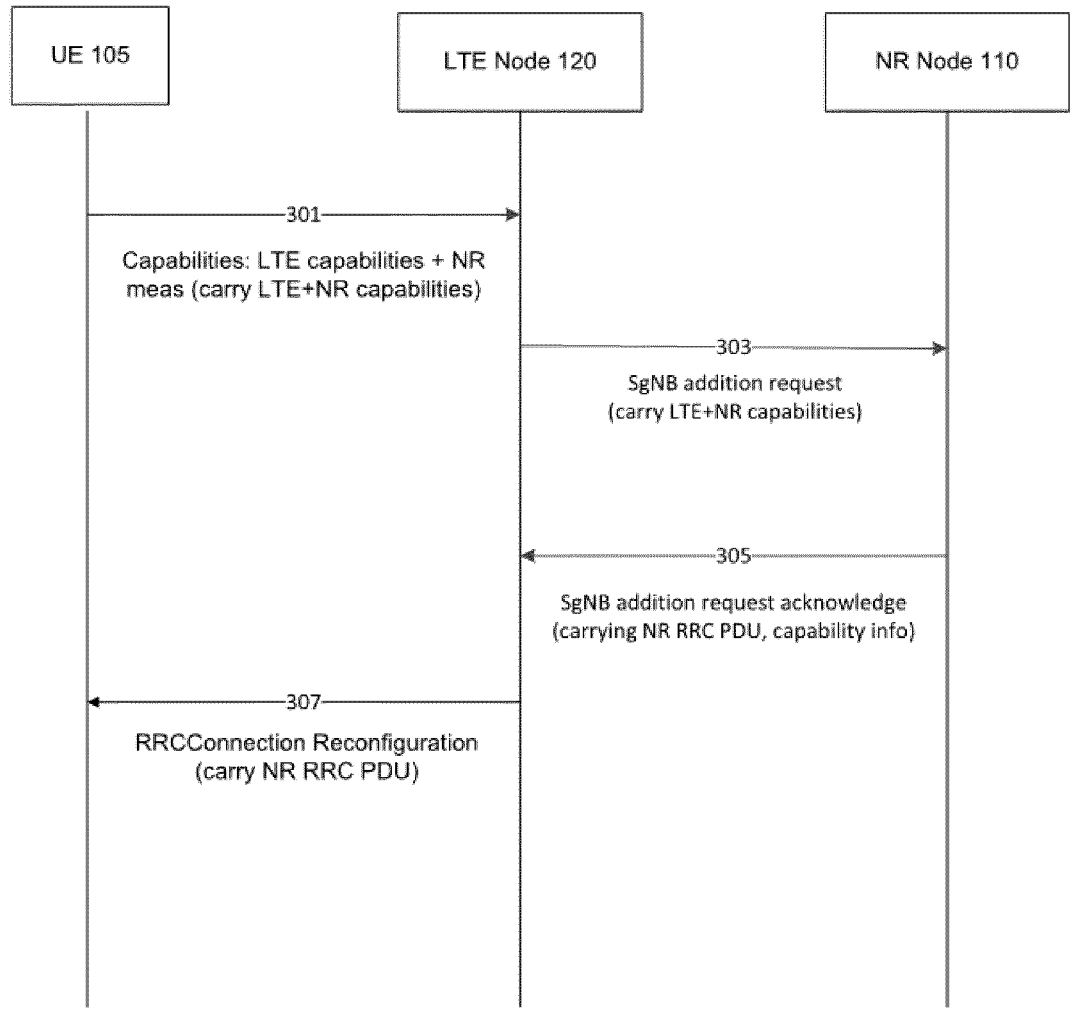
FIG. 3 illustrates a signaling diagram according to some embodiments.

FIG. 3 is an exemplary signaling diagram according to some embodiments. The embodiment shown in FIG. 3 assumes a scenario with the LTE node 120 (e.g., LTE base station (a.k.a., (eNB)) acting as master and the NR Node 110 (e.g., NR base station (a.k.a., gNB)) acting as a secondary node. The procedure starts with the UE 105 transmitting message 301 (e.g., LTE RRC message) providing the LTE capability information, including some basic NR capability, e.g., measurement capabilities, to the LTE Node 120. The full LTE+NR capability information may be included in an NR RRC message 301 included in an information element (IE) of the LTE RRC message 301, which IE may function as a transparent container.

In response to receiving message 301, the LTE node 120 then forwards the NR RRC message containing the LTE+NR capability information to the NR Node 110 in message 303 (e.g., an SgNB addition request message). The NR Node 110 then selects an NR SCG configuration based on the received LTE+NR capability information (e.g., based on the joint capability information and other information or based only on the joint capability information). The selected SCG configuration is sent from the NR Node 110 back to the LTE Node 120 in message 305 (e.g., an addition request acknowledge message), which includes capability information for the LTE Node 120 to be able to select an LTE MCG configuration such that the UE capabilities are not exceeded. Next, the LTE Node 120 creates the final RRC connection reconfiguration message 307, including both MCG and SCG configurations, and sends it to the UE 105.

The embodiment of FIG. 3 includes the LTE+NR capability information in the NR specification, leaving only minor NR information in the LTE specifications. Because of this, there is the possibility to rethink the way in which UE capabilities are signaled, e.g. to reduce the capability structure by reducing the dependencies between capabilities.

In some embodiments, NR RRC PDU shown in message 305 of FIG. 3 cannot be understood by the MeNB 120. Yet, in another embodiment, the NR RRC message 305 can be included as an Information Element (IE) within the LTE RRC message, and thus can be understood by the MeNB 120.

In some embodiments, LTE capabilities may not be sent by the NR Node 110 to the LTE Node 120 in message 305. Instead, the already reported LTE capabilities are used by LTE Node 120 when deciding the LTE capabilities to be used. However, in other embodiments, the reported LTE capabilities in the NR capability signaling (e.g., message 305) are sent to the LTE Node 120 in order to select the LTE capabilities within this set. In either case, the NR Node 110 informs the LTE Node 120 what NR capabilities to be used or not to be used.

In yet a further embodiment, the LTE Node 120 implementation may be such that it is able to read and decode the LTE+NR capabilities included in the transparent container of message 301. In this embodiment, the LTE Node 120, using this information, will be able select a LTE MCG configuration and pass it on to the NR Node 110 in the SgNB addition request message 303. The NR Node 110 can then select a NR SCG configuration such that the UE capabilities are not exceeded.

Figure 7:
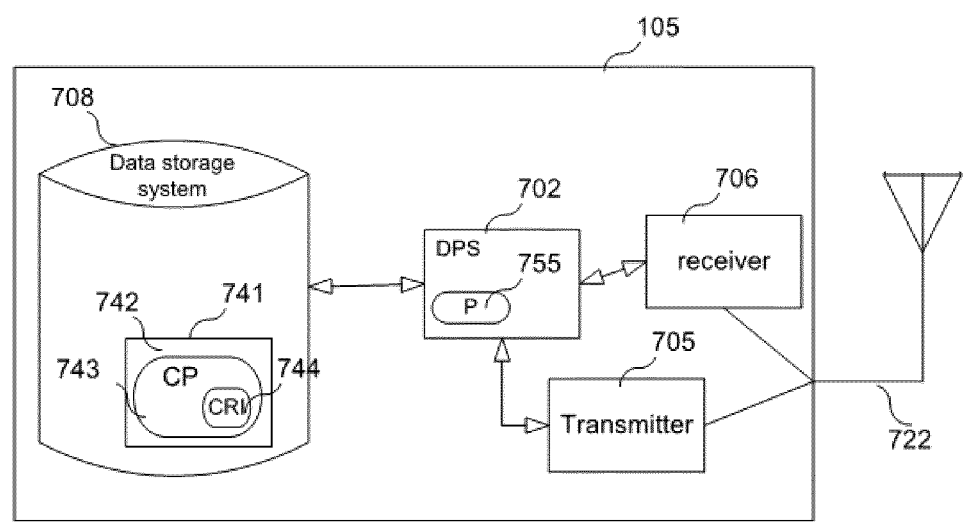
FIG. 7 is a block diagram of a UE according to some embodiments.

FIG. 7 is a block diagram of a UE 105 according to some embodiments. As shown in FIG. 7, the UE may comprise: a data processing system (DPS) 702, which may include one or more processors 755 (e.g., a general purpose microprocessor and/or one or more other processors, such as an application specific integrated circuit (ASIC), field-programmable gate arrays (FPGAs), and the like); a radio transmitter 705 and a radio receiver 706 coupled to an antenna 722 for use in wirelessly communicating with a radio access network (RAN) node (e.g., a TRP); and local storage unit (a.k.a., "data storage system") 712, which may include one or more non-volatile storage devices and/or one or more volatile storage devices (e.g., random access memory (RAM)). In embodiments where the UE includes a general purpose microprocessor, a computer program product (CPP) 741 may be provided. CPP 741 includes a computer readable medium (CRM) 742 storing a computer program (CP) 743 comprising computer readable instructions (CRI) 744. CRM 742 may be a non-transitory computer readable medium, such as, but not limited, to magnetic media (e.g., a hard disk), optical media (e.g., a DVD), memory devices (e.g., random access memory), and the like. In some embodiments, the CRI 744 of computer program 743 is configured such that when executed by data processing system 702, the CRI causes the UE to perform steps described above (e.g., steps described above with reference to the flow charts). In other embodiments, the UE may be configured to perform steps described herein without the need for code. That is, for example, data processing system 702 may consist merely of one or more ASICs. Hence, the features of the embodiments described herein may be implemented in hardware and/or software.

Figure 8:
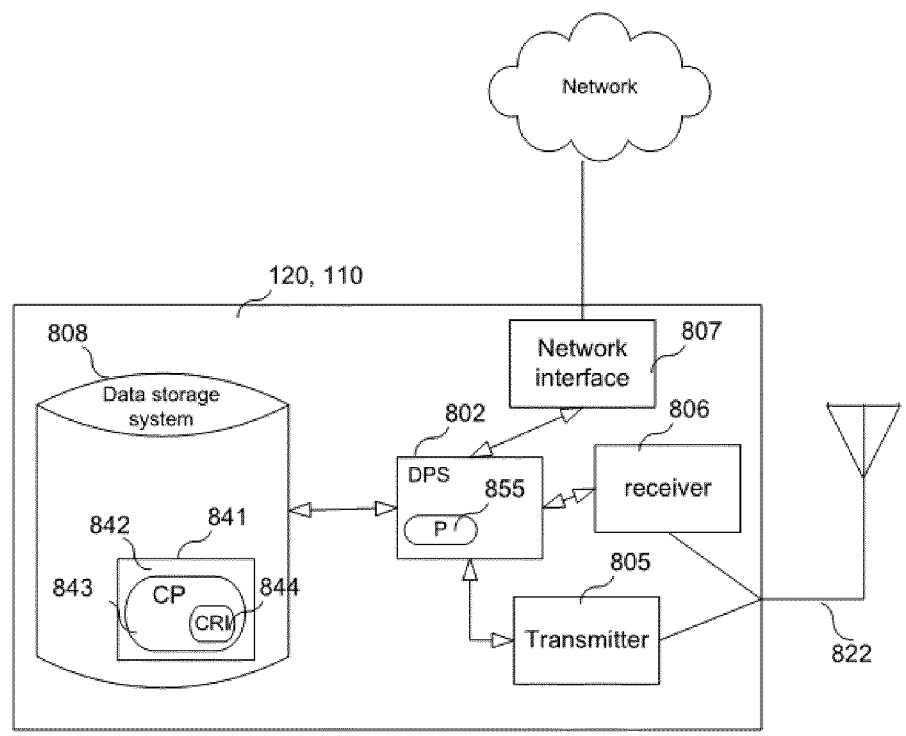
FIG. 8 is a block diagram of a network node according to some embodiments.

FIG. 8 is a block diagram of a network node (e.g., LTE node 120, NR node 110) according to some embodiments. As shown in FIG. 8, the network node may comprise: a data processing system (DPS) 802, which may include one or more processors 855 (e.g., a general purpose microprocessor and/or one or more other processors, such as an application specific integrated circuit (ASIC), field-programmable gate arrays (FPGAs), and the like); a radio transmitter 805 and a radio receiver 806 coupled to an antenna 822 for use in wirelessly communicating with a UE; a network interface 807 for enabling network node to connect to a network and communicate with other network nodes via the network; and storage unit (a.k.a., "data storage system") 812, which may include one or more non-volatile storage devices and/or one or more volatile storage devices (e.g., random access memory (RAM)). In embodiments where the network node includes a general purpose microprocessor, a computer program product (CPP) 841 may be provided. CPP 841 includes a computer readable medium (CRM) 842 storing a computer program (CP) 843 comprising computer readable instructions (CRI) 844. CRM 842 may be a non-transitory computer readable medium, such as, but not limited, to magnetic media (e.g., a hard disk), optical media (e.g., a DVD), memory devices (e.g., random access memory), and the like. In some embodiments, the CRI 844 of computer program 843 is configured such that when executed by data processing system 802, the CRI causes the network node to perform steps described above (e.g., steps described above with reference to the flow charts). In other embodiments, the network node may be configured to perform steps described herein without the need for code. That is, for example, data processing system 802 may consist merely of one or more ASICs. Hence, the features of the embodiments described herein may be implemented in hardware and/or software.

Figure 9:
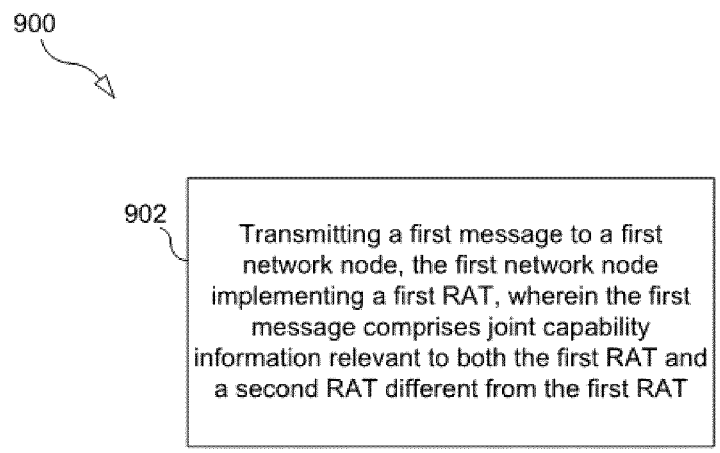
FIG. 9 illustrates an exemplary flow chart according to some embodiments.

FIG. 9 illustrates an exemplary flow chart according to some embodiments. Method 900 may be performed by a user equipment (UE) to signal capabilities for a first radio access technology (RAT) and a second RAT different from the first RAT. The method (900) comprises transmitting (902) a first message to a first network node, the first network node (110, 120) implementing the first RAT, wherein the first message comprises joint capability information relevant to both the first RAT and the second RAT.

Figure 10:
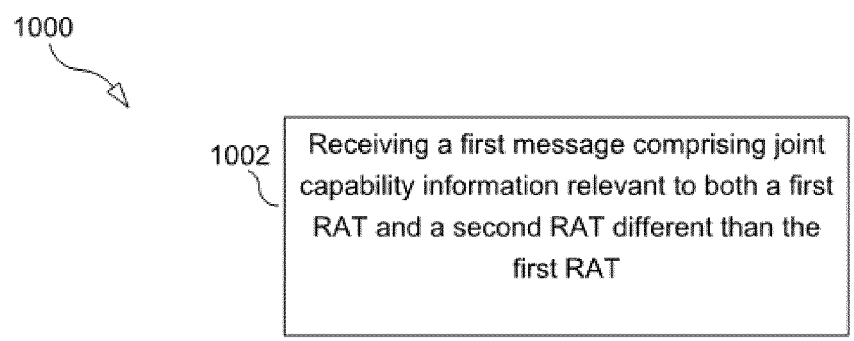
FIG. 10 illustrates an exemplary flow chart according to some embodiments.

FIG. 10 illustrates an exemplary flow chart according to some embodiments. Method 1000 may be performed by a first network node (110, 120) of a first Radio Access Technology, RAT. The method (1000) comprises receiving (1002) a first message comprising joint capability information relevant to both the first RAT and a second RAT different than the first RAT.

Additional Embodiments

UE Embodiment

Figure 4:
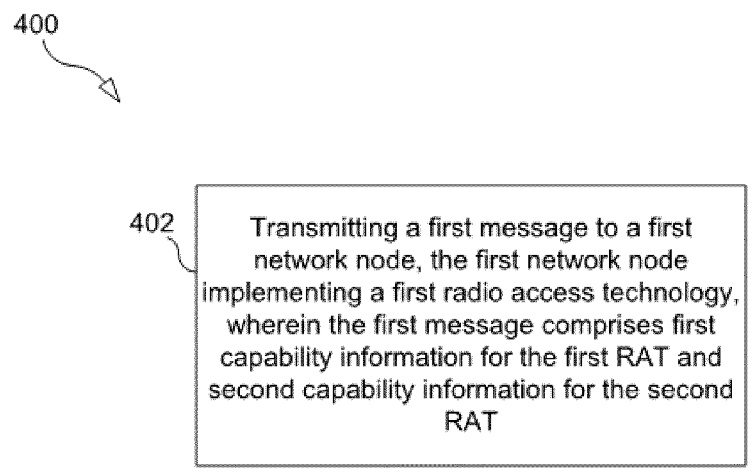
FIG. 4 illustrates an exemplary flow chart according to some embodiments.

1. A method (400, see FIG. 4) performed by a user equipment (UE) to signal capabilities for a first radio access technology (RAT) and a second RAT different from the first RAT, the method comprising: transmitting (402) a first message to a first network node, the first network node implementing the first RAT, wherein the first message comprises first capability information for the first RAT and second capability information for the second RAT.

2. The method of embodiment 1, further comprising: receiving a second message from the first network node, the second message comprising configuration data, wherein the configuration data comprises a first configuration for the first RAT and a second configuration for the second RAT.

3. The method of any one of embodiments 1-2, wherein the first RAT is a Long Term Evolution (LTE) RAT and the second rate is a New Radio RAT.

4. A UE comprising a memory, a transmitter, a receiver and a data processing system comprising one or more processors, wherein the UE is configured to perform any one of embodiments 1-3.

LTE Node Embodiment

Figure 5:
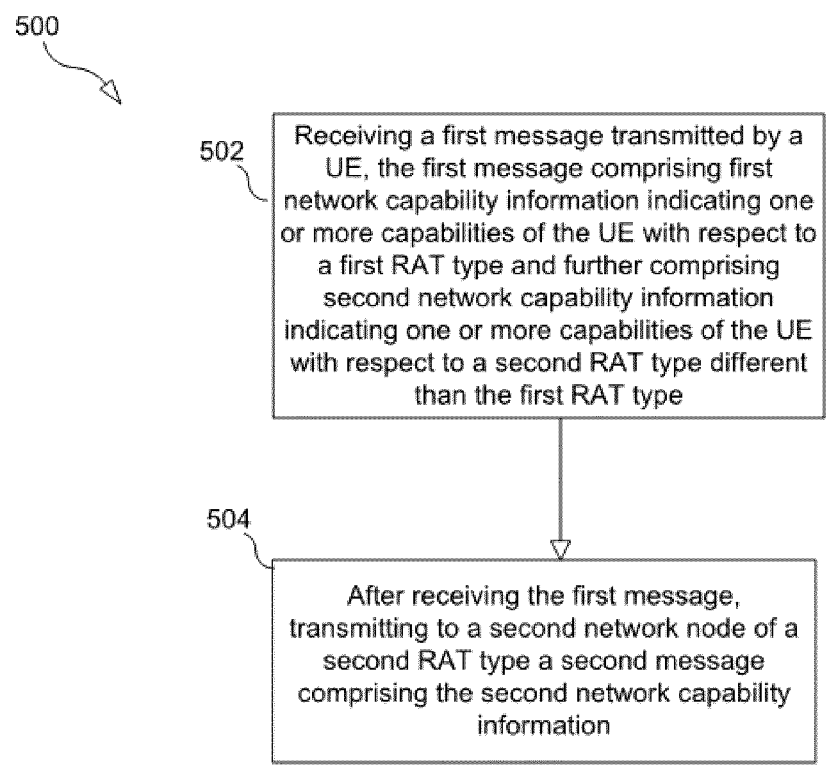
FIG. 5 illustrates an exemplary flow chart according to some embodiments.

5. A method (500, see FIG. 5) performed by a first network node (e.g., a base station) of a first RAT type, the method comprising: receiving (502) a first message transmitted by a UE, the first message comprising first network capability information indicating one or more capabilities of the UE with respect to the first RAT type and further comprising second network capability information indicating one or more capabilities of the UE with respect to a second RAT type different than the first RAT type; and after receiving the first message, transmitting (504) to a second network node of a second RAT type a second message comprising the second network capability information.

6. The method of embodiment 5, further comprising: after transmitting the second message, receiving a third message transmitted by the second network node.

7. The method of embodiment 6, wherein the third message comprises configuration information selected by the second network node based on the second network capability information.

8. The method of embodiments 6 or 7, wherein the third message further comprises UE capability information enabling the first network node to select a configuration for the UE (e.g., an LTE MCG configuration may be selected such that the UE capabilities are not exceeded).

9. The method of any one of embodiments 6-8, wherein the third message comprises an RRC PDU (e.g., an NR RRC PDU), and the method further comprises the first network node forwarding the RRC PDU to the UE.

NR Node Embodiment

Figure 6:
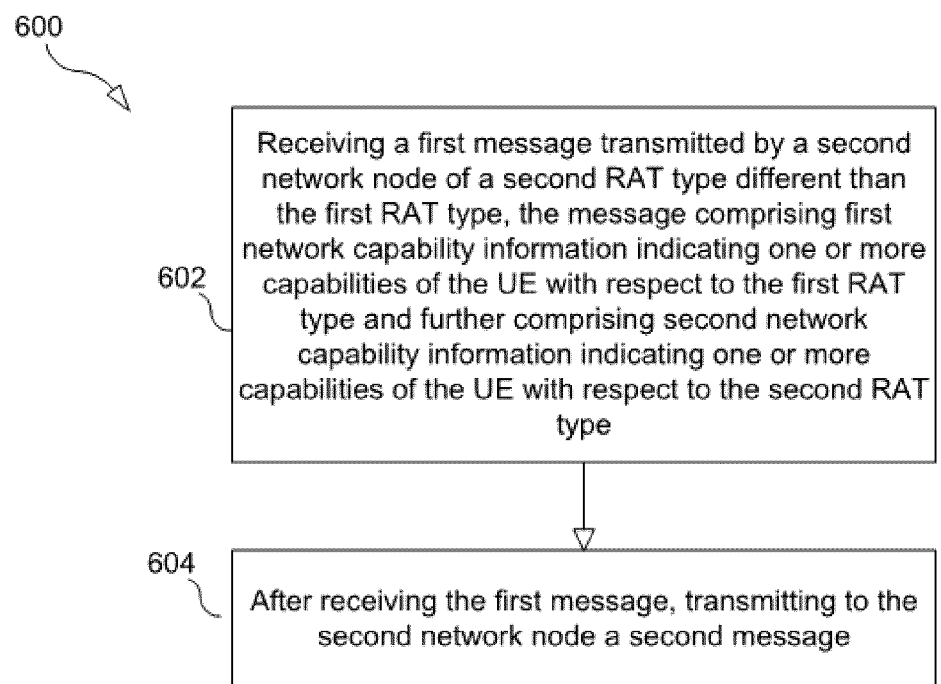
FIG. 6 illustrates an exemplary flow chart according to some embodiments.

10. A method (600, see FIG. 6) performed by a first network node (e.g., a NR base station) of a first RAT type (e.g, NR RAT type), the method comprising: receiving (602) a first message transmitted by a second network node of a second RAT type different than the first RAT type, the message comprising first network capability information indicating one or more capabilities of a UE with respect to the first RAT type and further comprising second network capability information indicating one or more capabilities of the UE with respect to the second RAT type; and after receiving the first message, transmitting (602) to the second network node a second message.

11. The method of embodiment 10, wherein the method further comprises the first network node selecting configuration information for the UE based on the first network capability information; and the second message comprises the selected configuration information.

12. The method of embodiments 10 or 11, wherein the second message comprises UE capability information enabling the second network node to select a configuration for the UE (e.g., an LTE MCG configuration may be selected such that the UE capabilities are not exceeded).

13. The method of any one of embodiments 10-12, wherein the second message comprises an RRC PDU (e.g., an NR RRC PDU), and the first network node is configured to forward the RRC PDU to the UE.

While various embodiments of the present disclosure are described herein (and in the appendix), it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The text that follows is the material from the appendix filed with U.S. Provisional Application No. 62/417,802, filed on Nov. 4, 2016, to which this application claims priority:

3GPP TSG-RAN WG2 #96 Tdoc R2-16xxxx
Reno, Nev., USA, 14-18 Nov. 2016
Agenda Item: 9.2.2.3
Source: Ericsson
Title: UE capability signalling for tight interworking
Document for: Discussion, Decision
Introduction In RAN2#95, the following agreements were made regarding the UE capability signalling: From a RAN2 perspective, we aim to have an independent capability information for NR and LTE (meaning that node of one RAT does not need to look at the capabilities of the other RAT). Does not preclude that capabilities of one RAT might contain some information related to the other RAT (e.g. at least measurement capabilities).

Then, in RAN2#95bis the following was agreed regarding UE capability signalling: 2: We should aim to minimum the differences between the NR capability reporting across the LTE/NR tight interworking cases (NR gNB as a master node) and the standalone NR gNB case. 3: At least some band combinations across RATs should be coordinated across the master and the secondary nodes. 4: Layer 2 buffer capabilities should be coordinated across the RATs should be coordinated across the master and the secondary nodes. And Agreements: 1: Agree the following principle: the master node and the secondary node only need to use own RAT UE capabilities (which will include some other RAT capabilities relating to the interworking). At least for the initial configuration of interworking case these are provided on the master node RAT or from core network In this paper we discuss UE capability signalling for tight interworking.

1. Discussion 1.1 NR capability signalling. Capability signalling for LTE became increasingly complex. NR offers the opportunity to rethink the way in which the capabilities are signalled. If such changes are made, it will also affect how capabilities are signalled to support tight interworking. Therefore, we think the discussion should start for the NR standalone case, and can then be extended to the interworking case. See our initial thinking on the NR capability signalling in [00117].

Proposal 1: NR capability signalling should be discussed before agreeing on the solution for UE capability coordination for LTE-NR tight interworking.

1.2 Capabilities requiring coordination. In RAN2#95bis, it was agreed that at least band combinations and L2 buffer capabilities should be coordinated across the master and the secondary nodes. Before taking further agreements on capabilities to be coordinated, we think RAN4 should be consulted for further input on capabilities that may be shared between LTE and NR and that would need coordination.

Proposal 2: RAN4 should be asked for further input on capabilities needing coordination between LTE and NR.

1.3 Signalling procedures. In this section, different procedures for UE capability signalling are discussed. Here deployment option 3, with LTE as master and NR as secondary node is used as example. Two alternatives are presented for discussion. The first alternative is shown in FIG. 1, in which LTE+NR capabilities including all possible combinations are signalled from UE to network via LTE RRC. Having received the capability information, the LTE eNB decides the MCG configuration and sends a "SgNB addition request" message (exact naming of the X2 AP messages and procedures in FIGS. 1 and 2 is FFS, RAN3 topic) to the NR gNB, including the MCG configuration and necessary capability information for the NR gNB to select the NR SCG configuration. Based on this information the NR gNB selects the SCG configuration, ensuring the LTE+NR capabilities are not exceeded. It then sends the SCG configuration back to the LTE eNB, contained in an NR RRC PDU, as agreed in RAN2#95bis. The LTE eNB finally sends the LTE RRC connection reconfiguration message to the UE, including the NR RRC PDU, containing the SCG configuration.

FIG. 1: UE capability signalling (Alternative 1). 1. Capabilities: LTE+NR capabilities from UE to LTE eNB. 2. "SgNB addition request" (carry MCG configuration, capability info) from LTE eNB to NR gNB. 3. "SgNB addition request acknowledge" (carry NR RRC PDU) from NR gNB to LTE eNB. 4. RRC connection reconfiguration (carry NR RRC PDU) from LTE eNB to UE.

Alternative 2 minimizes the impact on LTE specifications by including the LTE+NR capability information including all possible combinations mainly in the NR RRC specification. The procedure starts with the UE providing the LTE capability information, including some basic NR capability, e.g. measurement capabilities via LTE RRC to the LTE eNB. The full LTE+NR capability information is included in an NR RRC message carried in a transparent container of the LTE RRC message. The LTE eNB then forwards the NR RRC message containing the LTE+NR capability information to the NR gNB in the "SgNB addition request" message. The NR gNB then selects the NR SCG configuration based on the LTE+NR capability information. The SCG configuration is sent back to the LTE eNB as an NR RRC PDU in the "SgNB addition request acknowledge" message, carrying also the necessary capability information for the LTE eNB to be able to select the LTE MCG configuration such that the UE capabilities are not exceeded. Finally, the LTE eNB creates the final RRC connection reconfiguration message, including both MCG and SCG configurations, and sends it to the UE.

FIG. 2: UE capability signalling (Alternative 2). 1. Capabilities: LTE capabilities+NR meas (carry LTE+NR capabilities) from UE to LTE eNB. 2. "SgNB addition request" (carry LTE+NR capabilities) from LTE eNB to NR gNB. 3. "SgNB addition request acknowledge" (carrying NR RRC PDU, capability info) from NR gNB to LTE eNB. 4. RRC connection reconfiguration (carry NR RRC PDU) from LTE eNB to UE.

The main difference between alternative 1 and 2 is in the way they impact the LTE and NR specifications. Alternative 1 has more impact on the LTE specifications, as the LTE+NR capability information including all possible combinations is added into the LTE specification. Alternative 2 on the other hand includes the LTE+NR capability information in the NR specification, leaving only minor NR information in the LTE specifications. Because of this, we prefer alternative 2, as it gives us the possibility to rethink the way in which UE capabilities are signalled, e.g. to reduce the capability structure by reducing the dependencies between capabilities. Our proposal is therefore to take alternative 2 as working assumption for LTE-NR tight interworking.

Proposal 3: The LTE-NR capability information including possible combinations should be included in the NR specification.

Conclusion. Based on the above discussion we propose the following: Proposal 1 NR capability signalling should be discussed before agreeing on the solution for UE capability coordination for LTE-NR tight interworking. Proposal 2 RAN4 should be asked for further input on capabilities needing coordination between LTE and NR. Proposal 3 The LTE-NR capability information including possible combinations should be included in the NR specification.

References: [1] 3GPP TS 36.300, "Evolved Universal Terrestrial Radio Access (E-UTRA) and Evolved Universal Terrestrial Radio Access Network (E-UTRAN); Overall description; Stage 2", ver 13.4.0; [2] R2-166782, UE capability principle and signalling, Ericsson, RAN2#95bis; [3] R2-166775, RRC configuration in LTE-NR tight interworking, Ericsson, RAN2#95bis.

The invention claimed is:

1. A method performed by a user equipment (UE) to signal capabilities for a first radio access technology (RAT) and a second RAT different from the first RAT, the method comprising:
   transmitting a first message to a first network node, the first network node implementing the first RAT, wherein the first message comprises joint UE capability information relevant to both the first RAT and the second RAT, wherein
   the first RAT is a Long Term Evolution (LTE) RAT and the second RAT is a New Radio (NR) RAT, wherein
   the first message is a LTE Radio Resource Control (RRC) message comprising an NR RRC Protocol Data Unit (PDU) comprising the joint UE capability information.

2. The method of claim 1, wherein the joint UE capability information comprises band combination information.

3. The method of claim 1, further comprising:
   receiving a second message from the first network node, the second message comprising configuration data, wherein the configuration data comprises a first configuration for the first RAT and a second configuration for the second RAT.

4. A user equipment (UE), The UE comprising a memory, a transmitter, a receiver, and a data processing system comprising one or more processors, wherein the UE is configured to perform the method of claim 1.

5. A method performed by a first network node of a first Radio Access Technology (RAT), the method comprising:
   receiving from a UE a first message comprising joint UE capability information relevant to both the first RAT and a second RAT different than the first RAT, wherein the first RAT is a Long Term Evolution (LTE) RAT and the second RAT is a New Radio (NR) RAT;
   after receiving the first message, transmitting to a second network node of the second RAT a second message comprising the joint UE capability information; and
   after transmitting the second message, receiving a third message transmitted by the second network node, wherein the third message comprises configuration information for the UE selected by the second network node based on the joint UE capability information.

6. The method of claim 5, wherein the first message is a LTE Radio Resource Control, RRC, message comprising one of:
   a New Radio (NR) Radio Resource Control (RRC) Protocol Data Unit (PDU) comprising the joint UE capability information, and
   a NR RRC Information Element (IE) comprising the joint capability UE information.

7. The method of claim 5, wherein the joint UE capability information comprises band combination information.

8. The method of claim 5, wherein the third message further comprises UE capability information enabling the first network node to select a second configuration for the UE.

9. The method of claim 8, wherein the second configuration to be selected is a NR SCG configuration.

10. The method of claim 5, further comprising:
    the first network node reads and decodes the joint UE capability information included in the first message;
    the first network node uses the joint UE capability information to select an LTE Master Cell Group, MCG configuration; and
    the first network node transmits to the second network node information pertaining to the selected LTE MCG configuration.

11. A method performed by a second network node of a second Radio Access Technology (RAT), the method comprising:
    receiving from a first network node of a first RAT a first message comprising UE capability information, said UE capability information comprising UE Long Term Evolution (LTE) capability information and UE New Radio (NR) capability information (LTE+NR capability information);

reading and decoding the UE LTE+NR capability information included in the first message;

using the UE LTE+NR capability information to select a New Radio (NR) Secondary Cell Group (SCG) configuration; and transmitting to the first network node a second message comprising an NR Radio Resource Control (RRC) message comprising the selected SCG configuration, wherein the first RAT is an LTE RAT and the second RAT is a NR RAT.

12. A network node, comprising a memory, a transmitter, a receiver, and a data processing system comprising one or more processors, wherein the network node is configured to perform the method of claim 5.

13. A method performed by a user equipment (UE) to signal capabilities for a first radio access technology (RAT) and a second RAT different from the first RAT, the method comprising:

generating a first message comprising: i) first encoded UE capability information encoding UE Long Term Evolution (LTE) capability information and ii) a container for a second base station implementing the second RAT, the container containing second encoded UE capability information, said second encoded UE capability information encoding UE Long Term Evolution (LTE) capability information and UE New Radio (NR) capability information (LTE+NR capability information);

transmitting the first message to a first base station implementing the first RAT, wherein the first base station is configured to forward the container to the second base station; and receiving a second message transmitted by the first base station, the second message comprising: i) Master Cell Group (MCG) configuration information selected by the first base station and ii) Secondary Cell Group (SCG) configuration information selected by the second base station based on the LTE+NR capability information.

* * * * *